(12) United States Patent
Murrow et al.

(10) Patent No.: US 10,822,101 B2
(45) Date of Patent: *Nov. 3, 2020

(54) VERTICAL TAKEOFF AND LANDING AIRCRAFT HAVING A FORWARD THRUST PROPULSOR

(71) Applicant: General Electric Company, Schenectady, NY (US)

(72) Inventors: Kurt David Murrow, Liberty Township, OH (US); Darek Tomasz Zatorski, Fort Wright, KY (US); Andrew Breeze-Stringfellow, Montgomery, OH (US); Randy M. Vondrell, Cincinnati, OH (US); Dominic Barone, Centerville, OH (US)

(73) Assignee: General Electric Company, Schenectady, NY (US)

( * ) Notice: Subject to any disclaimer, the term of this patent is extended or adjusted under 35 U.S.C. 154(b) by 315 days.

This patent is subject to a terminal disclaimer.

(21) Appl. No.: 15/699,349

(22) Filed: Sep. 8, 2017

(65) Prior Publication Data

US 2019/0023408 A1 Jan. 24, 2019

Related U.S. Application Data

(60) Provisional application No. 62/535,444, filed on Jul. 21, 2017.

(51) Int. Cl.
*B64D 27/24* (2006.01)
*B64C 3/32* (2006.01)
(Continued)

(52) U.S. Cl.
CPC .............. *B64D 27/24* (2013.01); *B64C 3/32* (2013.01); *B64C 3/38* (2013.01); *B64C 29/0025* (2013.01);
(Continued)

(58) Field of Classification Search
CPC ............ B64C 29/0016; B64C 29/0025; B64D 2027/026
See application file for complete search history.

(56) References Cited

U.S. PATENT DOCUMENTS 3,056,565 A * 10/1962 Griffith ............... B64C 29/0025
244/12.3
3,310,260 A * 3/1967 Chichester-Miles ......................
B64C 29/0025
244/12.5

(Continued)

OTHER PUBLICATIONS

Wikipedia, NASA GL-10 Greased Lightning, https://en.wikipedia.org/wiki/NASA_GL-10_Greased_Lightning.

*Primary Examiner* — Joseph W Sanderson
(74) *Attorney, Agent, or Firm* — Dority & Manning, P.A.

(57) ABSTRACT

An aircraft includes a fuselage; a wing coupled to, and extending from, the fuselage; and a hybrid-electric propulsion system. The hybrid-electric propulsion system includes a power source including a combustion engine and an electric generator; a plurality of vertical thrust electric fans integrated into the wing and oriented to generate thrust along the vertical direction, the plurality of vertical thrust electric fans arranged along a length of the wing and driven by the power source; and a forward thrust propulsor. The forward thrust propulsor it is selectively or permanently mechanically coupled to the combustion engine.

20 Claims, 8 Drawing Sheets

(51) Int. Cl.
*B64C 29/00* (2006.01)
*B64C 3/38* (2006.01)
*B64D 29/04* (2006.01)
*B64D 27/08* (2006.01)
*B64D 35/02* (2006.01)
*B64D 33/04* (2006.01)
*B64D 31/06* (2006.01)
*B64D 27/02* (2006.01)
*B64D 27/26* (2006.01)
*H02K 7/18* (2006.01)

(52) U.S. Cl.
CPC ............ *B64D 27/08* (2013.01); *B64D 29/04* (2013.01); *B64D 31/06* (2013.01); *B64D 33/04* (2013.01); *B64D 35/02* (2013.01); *B64D 27/02* (2013.01); *B64D 27/26* (2013.01); *B64D 2027/026* (2013.01); *F05D 2220/76* (2013.01); *F05D 2270/093* (2013.01); *H02K 7/1823* (2013.01)

(56) References Cited

U.S. PATENT DOCUMENTS

| | | | | |
|---|---|---|---|---|
| 3,618,875 | A * | 11/1971 | Kappus | B64C 29/0025 244/12.3 |
| 4,828,203 | A * | 5/1989 | Clifton | B64C 29/0025 244/12.3 |
| 6,561,456 | B1 * | 5/2003 | Devine | B64C 29/0025 244/12.1 |
| 6,843,447 | B2 * | 1/2005 | Morgan | B64C 29/0025 244/12.3 |
| 7,188,802 | B2 | 3/2007 | Magre | |
| 7,267,300 | B2 * | 9/2007 | Heath | B64C 15/14 244/12.3 |
| 8,544,787 | B2 | 10/2013 | Lee et al. | |
| 8,640,985 | B2 | 2/2014 | Brunken, Jr. | |
| 8,655,510 | B2 | 2/2014 | Eglin | |
| 8,733,690 | B2 | 5/2014 | Bevirt et al. | |
| 8,777,150 | B2 | 7/2014 | Wang | |
| 8,870,114 | B2 | 10/2014 | Botti et al. | |
| 8,907,595 | B2 | 12/2014 | Weibel et al. | |
| 8,915,464 | B2 | 12/2014 | Ferrier et al. | |
| 8,931,732 | B2 | 1/2015 | Sirohi et al. | |
| 9,008,942 | B2 | 4/2015 | Dyrla et al. | |
| 9,126,678 | B2 | 9/2015 | Ross et al. | |
| 9,162,771 | B2 | 10/2015 | Roggemans et al. | |
| 9,174,728 | B2 | 11/2015 | Altmikus et al. | |
| 9,187,174 | B2 | 11/2015 | Shaw | |
| 9,199,732 | B2 | 12/2015 | Isaac et al. | |
| 9,242,729 | B1 | 1/2016 | Wang et al. | |
| 9,248,908 | B1 | 2/2016 | Luyks | |
| 9,284,059 | B2 | 3/2016 | Prud Homme-Lacroix | |
| 9,714,090 | B2 * | 7/2017 | Frolov | G08G 5/0021 |
| 9,889,928 | B2 * | 2/2018 | Salz | B64C 27/26 |
| 2006/0192046 | A1 * | 8/2006 | Heath | B64C 15/14 244/12.3 |
| 2007/0018035 | A1 * | 1/2007 | Saiz | B64C 15/00 244/12.3 |
| 2013/0140404 | A1 * | 6/2013 | Parks | G05D 1/102 244/23 A |
| 2015/0266571 | A1 | 9/2015 | Bevirt et al. | |
| 2015/0284075 | A1 | 10/2015 | Alber | |
| 2015/0380999 | A1 | 12/2015 | Joshi et al. | |
| 2016/0332741 | A1 * | 11/2016 | Moxon | B64C 15/00 |
| 2016/0368600 | A1 * | 12/2016 | Frolov | G08G 5/0021 |
| 2017/0158321 | A1 * | 6/2017 | Mia | B64C 29/0025 |
| 2017/0203839 | A1 * | 7/2017 | Giannini | B64D 29/02 |
| 2018/0079515 | A1 * | 3/2018 | Harwood | H02J 7/34 |
| 2018/0141652 | A1 * | 5/2018 | Deslypper | B64C 3/54 |
| 2018/0251228 | A1 * | 9/2018 | Sands | B64D 31/14 |
| 2019/0023389 | A1 * | 1/2019 | Murrow | B64D 31/06 |
| 2019/0023390 | A1 * | 1/2019 | Murrow | B64D 31/06 |
| 2019/0023391 | A1 * | 1/2019 | Murrow | B64D 31/06 |
| 2019/0047680 | A1 * | 2/2019 | Murrow | B64D 31/06 |
| 2019/0047681 | A1 * | 2/2019 | Murrow | B64D 31/06 |
| 2019/0047716 | A1 * | 2/2019 | Murrow | B64D 31/06 |
| 2019/0047717 | A1 * | 2/2019 | Murrow | B64D 31/06 |
| 2019/0047718 | A1 * | 2/2019 | Murrow | B64D 31/06 |
| 2019/0047719 | A1 * | 2/2019 | Murrow | B64D 31/06 |
| 2019/0061964 | A1 * | 2/2019 | Murrow | B64D 31/06 |
| 2019/0112039 | A1 * | 4/2019 | Pfaller | B64C 3/14 |
| 2019/0270517 | A1 * | 9/2019 | Morgan | B64C 7/02 |

* cited by examiner

VERTICAL TAKEOFF AND LANDING AIRCRAFT HAVING A FORWARD THRUST PROPULSOR

RELATED APPLICATION

The present application is based upon and claims priority to U.S. Provisional Patent Application Ser. No. 62/535,444, filed on Jul. 21, 2017.

FIELD

The present subject matter relates generally to a propulsion system for an aircraft having vertical takeoff and landing capabilities.

BACKGROUND

Aircraft have been developed with a capability for performing vertical takeoff and landings. Such a capability may allow for the aircraft to reach relatively rugged terrains and remote locations, where it may be impractical or infeasible to construct a runway large enough to allow for a traditional aircraft (lacking vertical takeoff capability) to takeoff or land.

Typically these aircraft capable of performing vertical takeoff and landings have engines and propulsors that are vectored to generate both vertical thrust and forward thrust. However, the design characteristics that make a propulsor efficient for vertical takeoff and landing may not result in efficient forward flight. Accordingly, existing aircraft capable of performing vertical takeoff and landing include propulsors that may be well suited for generating vertical thrust, but that may not be very well suited for efficient forward flight. This discrepancy between vertical takeoff and landing and cruise efficiency is exaggerated as cruise speed increases. An aircraft capable of more efficiently performing a vertical takeoff and landing combined with high speed cruise would therefore be useful.

BRIEF DESCRIPTION

Aspects and advantages of the invention will be set forth in part in the following description, or may be obvious from the description, or may be learned through practice of the invention.

In one embodiment of the present disclosure an aircraft is provided defining a vertical direction and a transverse direction. The aircraft includes a fuselage; a wing coupled to, and extending from, the fuselage; and a hybrid-electric propulsion system. The hybrid-electric propulsion system includes a power source including a combustion engine and an electric generator; a plurality of vertical thrust electric fans integrated into the wing and oriented to generate thrust along the vertical direction, the plurality of vertical thrust electric fans arranged along a length of the wing and driven by the power source; and a forward thrust propulsor. The forward thrust propulsor it is selectively or permanently mechanically coupled to the combustion engine.

In certain exemplary embodiments the combustion engine is a turboshaft engine comprising an output shaft, wherein the forward thrust propulsor includes a fan shaft, and wherein the output shaft is selectively or permanently mechanically coupled to the fan shaft.

In certain exemplary embodiments the forward thrust propulsor is configured as a variable pitch propulsor.

For example, in certain exemplary embodiments the variable pitch propulsor defines a pitch range enabling the variable pitch fan to generate forward thrust, reverse thrust, and substantially no thrust during operation.

In certain exemplary embodiments the propulsion system further includes a coupling unit, and wherein the combustion engine is selectively mechanically coupled to the forward thrust propulsor through the coupling unit.

For example, in certain exemplary embodiments the coupling unit includes at least one of a clutch or a torque converter.

For example, in certain exemplary embodiments the coupling unit includes a clutch.

For example, in certain exemplary embodiments the clutch is a one-way clutch.

In certain exemplary embodiments forward thrust propulsor is mounted to the fuselage of the aircraft at an aft end of the aircraft.

For example, in certain exemplary embodiments the forward thrust propulsor is a ducted fan.

For example, in certain exemplary embodiments the forward thrust propulsor is configured as a boundary layer ingestion fan defining an inlet extending substantially 360° around the fuselage.

In certain exemplary embodiments the propulsion system further includes a speed change mechanism, and wherein the combustion engine is mechanically coupled to the forward thrust propulsor through the speed change mechanism.

For example, in certain exemplary embodiments the speed change mechanism is a gearbox.

For example, in certain exemplary embodiments the speed change mechanism is a transmission.

For example, in certain exemplary embodiments the transmission is one of a continuously variable transmission or a hydraulic transmission.

In certain exemplary embodiments the power source further includes an electric energy storage unit, and wherein each of the plurality of electric fans is electrically coupled to and driven by at least one of the electric generator or the electric energy storage unit.

In certain exemplary embodiments the wing is a first wing, wherein the plurality of vertical thrust electric fans is a first plurality of vertical thrust electric fans. In such an exemplary embodiment, the aircraft may further include a second wing coupled to and extending from the fuselage, wherein the propulsion system further includes a second plurality of vertical thrust electric fans integrated into the second wing and oriented to generate thrust along the vertical direction, the second plurality of vertical thrust electric fans arranged along a length of the second wing.

In another exemplary embodiment of the present disclosure, a hybrid-electric propulsion system for an aircraft is provided. The hybrid electric propulsion system includes a power source including a combustion engine and an electric generator and a plurality of vertical thrust electric fans configured to be integrated into a wing of the aircraft in an orientation to generate thrust along a vertical direction of the aircraft. The plurality of vertical thrust electric fans our driven by the power source. The hybrid electric propulsion system also includes a forward thrust propulsor, the forward thrust propulsor selectively or permanently mechanically coupled to the combustion engine.

In certain exemplary embodiments the combustion engine is a turboshaft engine including an output shaft, wherein the forward thrust propulsor includes a fan shaft, and wherein the output shaft is selectively or permanently mechanically coupled to the fan shaft.

In certain exemplary embodiments the forward thrust propulsor is configured as a variable pitch propulsor, and wherein the variable pitch propulsor defines a pitch range enabling the variable pitch propulsor to generate forward thrust, reverse thrust, and substantially no thrust during operation.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally related to an aircraft capable of performing vertical takeoff and landing. More specifically, the present disclosure is related to such an aircraft including a fuselage, a plurality of wings coupled to and extending from the fuselage, and a propulsion system. The propulsion system includes a power source, a plurality of electric fans integrated into each of the wings, and a forward thrust propulsor. The power source includes a combustion engine and an electric generator operable with the combustion engine to generate electrical power during at least certain operations. Each of such plurality of electric fans are oriented to generate thrust along a vertical direction of the aircraft and are arranged along a length of the respective wing and are electrically powered by the power source. The forward thrust propulsor is selectively or permanently mechanically coupled to the combustion engine. Accordingly, the propulsion system may provide the flexibility to power the vertical lift fans remotely using electrical power, and further may power the forward thrust propulsor mechanically resulting in a more efficient overall system.

Figure 1:
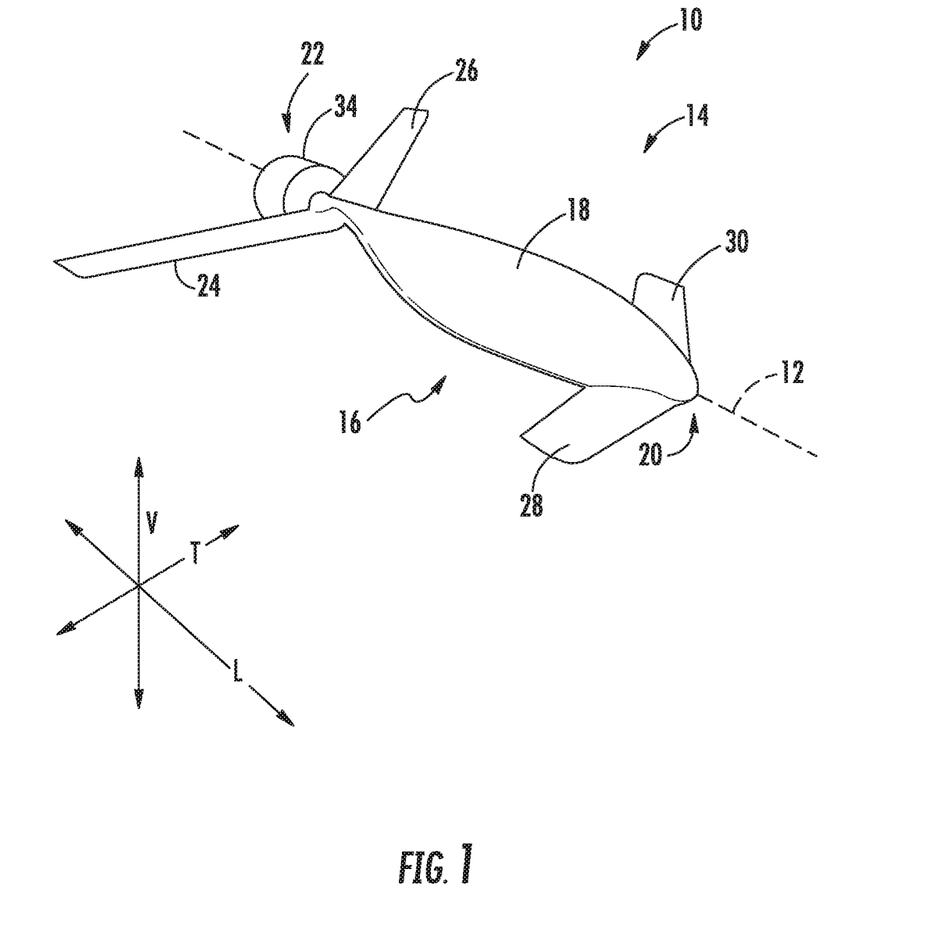
FIG. 1 is a perspective view of an aircraft according to various exemplary embodiments of the present disclosure.
Figure 2:
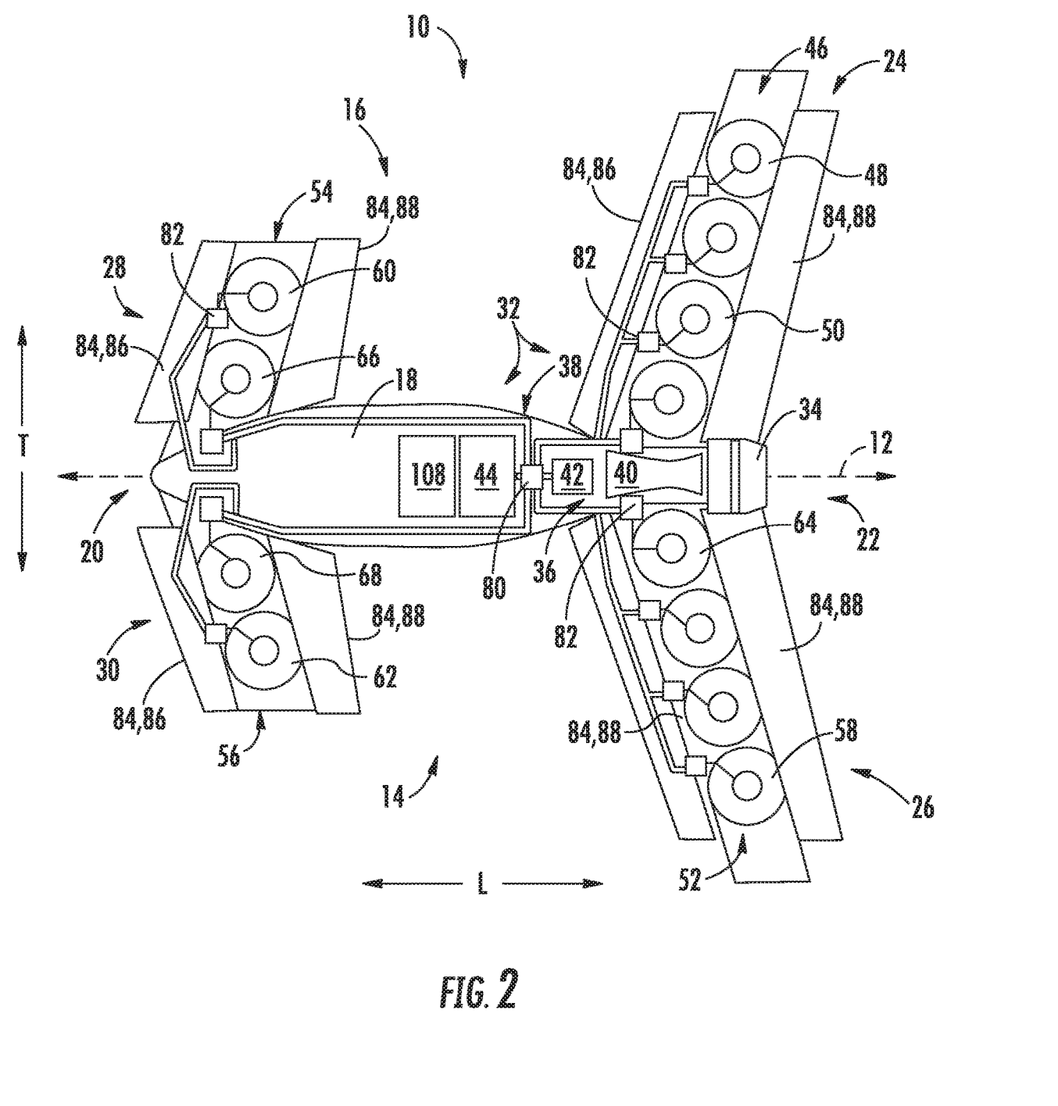
FIG. 2 is a top, schematic of the exemplary aircraft of FIG. 1 in a vertical flight position.
Figure 3:
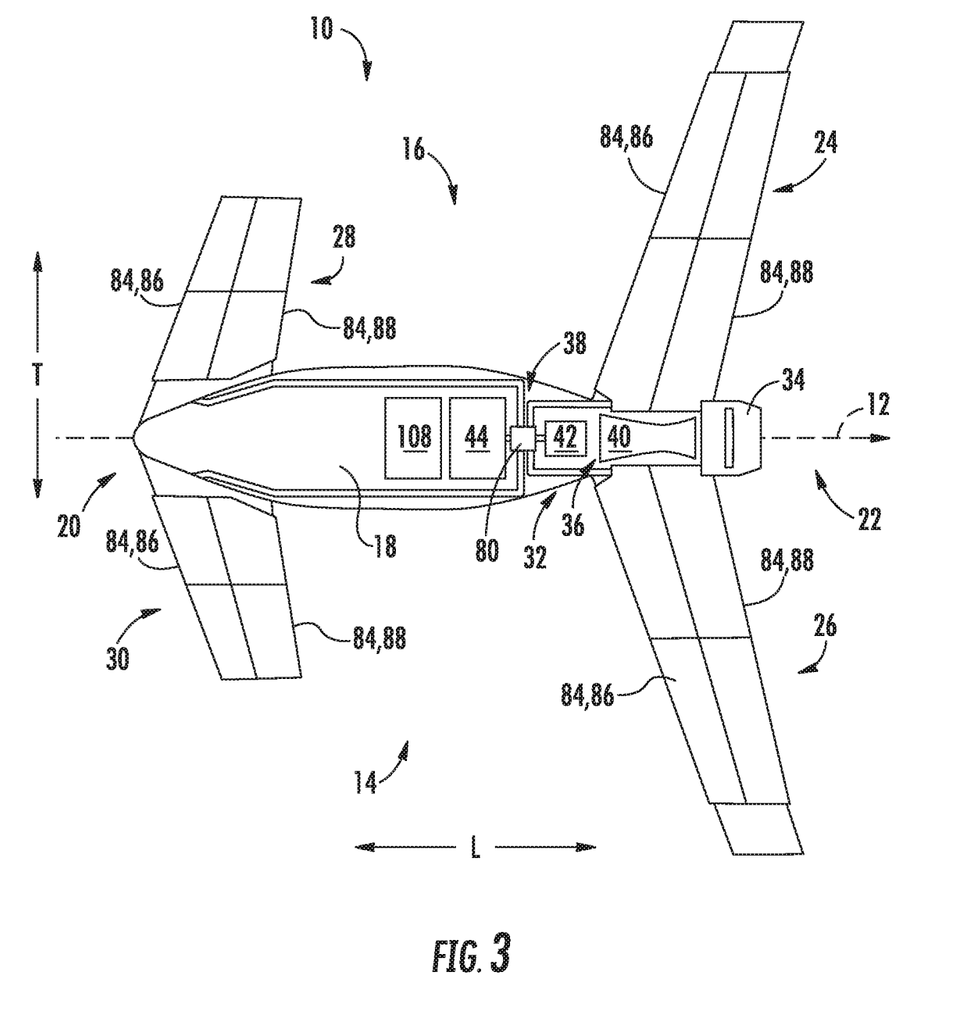
FIG. 3 is a top, schematic of the exemplary aircraft of FIG. 1 in a forward flight position.

Referring now to the drawings, wherein identical numerals indicate the same elements throughout the Figures ("Figs."), FIGS. 1 through 3 depict an aircraft 10 in accordance with various embodiments of the present disclosure. More specifically, FIG. 1 provides a perspective view of the exemplary aircraft 10; FIG. 2 provides a top, schematic view of the exemplary aircraft 10 of FIG. 1 in a vertical thrust configuration; and FIG. 3 provides a top, schematic view of the exemplary aircraft 10 of FIG. 1 in a forward thrust configuration. As shown in FIGS. 1 through 3 collectively, the aircraft 10 defines a longitudinal direction L (and a longitudinal centerline 12 that extends therethrough), a vertical direction V, and a transverse direction T. Additionally, the aircraft 10 defines a port side 14 and an opposite starboard side 16.

The aircraft 10 includes a fuselage 18 extending between a forward end 20 and an aft end 22 generally along the longitudinal centerline 12 of the aircraft 10. The aircraft 10 additionally includes a four wings, each attached to or formed integrally with the fuselage 18. Specifically, for the embodiment depicted, the aircraft 10 includes a first wing, a second wing, a third wing, and a fourth wing, or more particularly an aft starboard wing 24, an aft port wing 26, a forward starboard wing 28, and a forward port wing 30. Each of these wings 24, 26, 28, 30 is attached to, or formed integrally with, the fuselage 18 and extends from the fuselage 18 outwardly generally along the transverse direction T outwardly relative to the fuselage 18). It will be appreciated that although the forward port wing 30 and forward starboard wing 28 are depicted as being separate wings, in other embodiments, the forward port wing 30 and forward starboard wing 28 may be formed integrally, and together attached to the fuselage 18. Similarly, although the aft port wing 26 and aft starboard wing 24 are depicted as being separate wings, in other embodiments, the aft port wing 26 and aft starboard wing 24 may be formed integrally, and together attached the fuselage 18.

Although not depicted, in other embodiments, the aircraft 10 may additionally include one or more stabilizers, such as one or more vertical stabilizers, horizontal stabilizers, etc. Moreover, it will be appreciated, that although not depicted, in certain embodiments, one or more of the wings may additionally include flaps, such as leading-edge flaps or trailing edge flaps, for assisting with controlling the aircraft 10 during flight.

Referring still to FIGS. 1 through 3, the exemplary aircraft 10 further includes a propulsion system 32 for providing the aircraft 10 with a desired amount of thrust during operation. Broadly speaking, the exemplary propulsion system 32 includes a plurality of vertical thrust electric fans (or "VTE fans") for generating vertical thrust during operation, a forward thrust propulsor 34, and a power source 36 for driving the plurality of VTE fans and the forward thrust propulsor 34. Additionally, for the embodiment depicted, the propulsion system 32 includes an electric communication bus 38 for, e.g., providing electrical power from the power source 36 to the plurality of VTE fans.

More specifically, for the embodiment depicted, the power source 36 includes a combustion engine 40, an electric machine 42, and an electric energy storage unit 44. As will be described in greater detail below with reference to FIG. 6, the combustion engine 40 is configured to mechanically drive the forward thrust propulsor 34. More specifically, the forward thrust propulsor 34 is selectively or permanently mechanically coupled to the combustion engine 40. Additionally, the combustion engine 40 is coupled to the electric machine 42. Accordingly, in at least certain embodiments, the combustion engine 40 may drive the electric machine 42 such that the electric machine 42 may generate electrical power. In such a manner, the electric machine 42 may be configured as an electric generator. Further, with such an exemplary embodiment the electric machine 42 may provide the electrical power to, e.g., the plurality of VTE fans during at least certain operations of the aircraft, to the electric energy storage unit 44, or both. In such a manner, the plurality of VTE fans may be driven by the power source 36, and more particularly, may be driven at least in part by the electric machine 42.

Referring particularly to FIGS. 2 and 3, the electric energy storage unit 44 may be a battery or other suitable component for storing electrical power. The electric energy storage unit 44 may receive electrical power from, e.g., the electric machine 42 (operating as an electric generator), and store electrical power for use during operation of the aircraft 10. For example, the electric energy storage unit 44 may receive and store electrical power from the electric machine 42 (operating as an electric generator) during certain operations, and subsequently provide electrical power to the plurality of VTE fans during other operations. Additionally, in still other operations, the electric energy storage unit 44 may provide electrical power back to the electric machine 42 to, e.g., power the aft fan for short durations, power the combustion engine 40 during emergency operations, or add power to the forward thrust propulsor 34 and/or to the combustion engine 40 during high power demand operations. Accordingly, with such exemplary embodiment, the electric machine 42 may further be configured as an electric motor.

Referring to a first of the plurality of wings of the aircraft 10, and more particularly to the aft starboard wing 24 depicted in FIG. 2, the propulsion system 32 includes a first plurality of VTE fans 46 integrated into the aft starboard wing 24 and oriented to generate thrust along the vertical direction V. In such a manner, each of the first plurality of VTE fans 46 are vertical lift fans, and as will be discussed in more detail below, are fixed in position such that they are only capable of generating thrust substantially along the vertical direction V of the aircraft 10. As will be discussed in greater detail below, each of the first plurality of VTE fans 46 is electrically coupled to the power source 36 to receive electrical power from, e.g., the electric machine 42 or the electric energy storage unit 44.

It will be appreciated, that as used herein, the term "along the vertical direction V of the aircraft 10" refers to a vertical direction defined by a normal orientation of the aircraft 10. For example, if the aircraft 10 is, e.g., tilted forward during certain operations, the first plurality of VTE fans 46 may provide thrust in a direction that is still along the vertical direction of the aircraft 10, but tilted relative to absolute vertical direction. Additionally, in this context, the term "substantially" refers to being within about thirty degrees of the vertical direction V of the aircraft 10.

Additionally, the first plurality of VTE fans 46 are arranged along a length of the aft starboard wing 24 generally along the transverse direction T. Additionally, the first plurality of VTE fans 46 includes an outermost VTE fan 48 along the transverse direction T relative to the fuselage 18 of the aircraft 10 and at least one interior VTE fan 50. More particularly, for the embodiment of FIG. 2, the first plurality of VTE fans 46 includes three interior VTE fans 50. However, in other embodiments, the first plurality of VTE fans 46 may have any other suitable number of interior fans, as will be discussed in more detail below. It will be appreciated that the outermost VTE fan 48 is at least one of a variable pitch fan or a variable speed fan to provide increased stability to the aircraft 10. For example, in certain embodiments, the outermost VTE fan 48 may be a variable pitch and variable speed fan. As will be appreciated, by changing a pitch of a plurality of fan blades of the outermost VTE fan 48, an amount of thrust generated by the outermost VTE fan 48 may be modified without requiring any change to a rotational speed of the outermost VTE fan 48.

It will further be appreciated that the propulsion system 32 includes a similar plurality of electric fans integrated into the other wings 26, 28, 30 of the aircraft 10. Each of these electric fans are similarly oriented to generate thrust substantially along the vertical direction V of the aircraft 10, and in such a manner may therefore also be configured as VTE fans. More specifically, the propulsion system 32 further includes a second plurality of VTE fans 52 integrated into the aft port wing 26 and arranged along a length of the aft port wing 26, a third plurality of VTE fans 54 integrated into the forward starboard wing 28 and arranged along a length of the forward starboard wing 28, and a fourth plurality of VTE fans 56 integrated into the forward port wing 30 and arranged along a length of the forward port wing 30.

As with the first plurality of VTE fans 46, the second plurality of VTE fans 52 includes an outermost VTE fan 58 along the transverse direction T. Additionally, the third plurality of VTE fans 54 also includes an outermost VTE fan 60 along the transverse direction T and the fourth plurality of VTE fans 56 includes an outermost VTE fan 52 along the transverse direction T. The outermost VTE fans 58, 60, 62 of the second plurality of VTE fans 52, of the third plurality of VTE fans 54, and of the fourth plurality of VTE fans 56, respectively, are similarly configured as one of a variable pitch fan or a variable speed fan. More particularly, for the embodiment of FIG. 2, each of such outermost VTE fans 58, 60, 62 are configured as variable pitch fans. Accordingly, each of such outermost VTE fans 58, 60, 62 may be configured in substantially the same manner as the outermost VTE fan 48 of the first plurality of VTE fans 46 (see, e.g., FIGS. 5 and 6).

With reference back to the first plurality of VTE fans 46, for the embodiment of FIG. 2, at least one of the interior VTE fans 50 of the first plurality of VTE fans 46 is configured differently than the outermost VTE fan 48. More specifically, for the embodiment depicted, the interior VTE fans 50 of the first plurality of VTE fans 46 are each configured as fixed pitch fans, while the outermost VTE fan 48 is configured as a variable pitch fan (discussed above). Such a configuration may allow at least some of the first plurality of VTE fans 46 to have a more simple configuration, while the first plurality of VTE fans 46 may still provide a desired amount of stability for the aircraft 10 due to the inclusion of a variable pitch outermost VTE fan 48.

Similarly, the second plurality of VTE fans 52 includes at least one interior VTE fan 64, the third plurality of VTE fans 54 includes at least one interior VTE fan 66, and the fourth plurality of VTE fans 56 includes at least one interior VTE fan 68. More specifically, the second plurality of VTE fans 52 includes three interior VTE fans 64, the third plurality of VTE fans 54 includes one interior VTE fan 66, and the fourth plurality of VTE fans 56 also includes one interior VTE fan 68. For the embodiment depicted, each of the at least one interior VTE fans 64, 66, 68 of the respective pluralities of VTE fans 52, 54, 56 is configured differently than the outermost VTE fan 58, 60, 62 of the respective pluralities of VTE fans 52, 54, 56.

It will be appreciated, however, that in other exemplary embodiments, each of the respective pluralities of VTE fans 46, 52, 54, 56 may have any other suitable number of interior VTE fans 50, 64, 66, 68 and further that in certain exemplary embodiments, the at least one interior VTE fan 50, 64, 66, 68 of each plurality of VTE fans 46, 52, 54, 56 may be configured in the same manner as the outermost VTE fans 48, 58, 60, 62 of the respective plurality of VTE fans 52, 54, 56. For example, in other exemplary embodiments, each of the first plurality of VTE fans 46, second plurality of VTE fans 52, third plurality of VTE fans 54 and fourth plurality of VTE fans 56 may be configured as variable speed, fixed pitch fans, or alternatively, may each be configured as variable speed, variable pitch fans (the "variable speed" functionality described below).

Moreover, as is depicted in FIG. 2, the electric communication bus 38 electrically connects the power source 36, e.g., the electric machine 42 and/or the electric energy storage unit 44, to each of the pluralities of VTE fans 46, 52, 54, 56. Notably, for the embodiment depicted, the electric communication bus 38 includes a main controller 80 and a plurality of electric power controllers 82. The main controller 80 is electrically connected to both the electric machine 42 and the electric energy storage unit 44 and is configured to, e.g., direct electrical power from one or both of the electric machine 42 and electric energy storage unit 44 to each of the pluralities of VTE fans 46, 52, 54, 56. For example, in certain operations, the main controller 80 may direct electrical power from the electric machine 42 to each of the pluralities of VTE fans 46, 52, 54, 56, may direct electrical power from the electric energy storage unit 44 to each of the pluralities of VTE fans 46, 52, 54, 56, may direct electrical power from the electric machine 42 to the electric energy storage unit 44 (e.g., during forward flight), or may direct electrical power from the electric energy storage unit 44 to the electric machine 42 (e.g., during emergency operations or high power demand operations). Other operations are contemplated as well.

More specifically, the exemplary embodiment of FIG. 2 the electric communication bus 38 includes an electric power controller 82 for each VTE fan (i.e., each VTE fan of the first plurality of VTE fans 46, of the second plurality of VTE fans 52, of the third plurality of VTE fans 54, and of the fourth plurality of VTE fans 56). Additionally, each of the plurality of electric power controllers 82 is associated with one VTE fan of the pluralities of VTE fans 46, 52, 54, 56. More specifically, still, the power source 36 is electrically coupled to each VTE fan of the pluralities of VTE fans 46, 52, 54, 56 through the respective electric power controller 82. In such a manner, the electric power controller 82 may modify the electric power provided from the power source 36 to each respective VTE fan. Accordingly, for the embodiment shown, the propulsion system 32 includes twelve electric power controllers 82, one for each of the twelve VTE fans included within the propulsion system 32.

In certain exemplary embodiments, each of the electric power controllers 82 may be one or more of a power converter, a power inverter, or a power transformer. Accordingly, in certain exemplary embodiments, the electric power controllers 82 may be configured to convert electrical power received through the electric communication bus 38 from alternating current ("AC") electrical power to direct current ("DC") electrical power, or vice versa, and further may be configured in at least certain embodiments to modify an amount of the electrical power (e.g., a voltage or a current) received through the electric communication bus 38 from the power source 36 before transferring such electrical power to a respective VTE fan.

Accordingly, in at least certain embodiments each of the electric power controllers 82 may modify an amount of electrical power provided to a respective VTE fan, which as will be appreciated, may allow for the aircraft 10, and more specifically may allow for the main controller 80, to modify a rotational speed of each VTE fan of the pluralities of VTE fans 46, 52, 54, 56. For example, each of the electric power controllers 82 may be operably coupled to the main controller 80 through, e.g., a wired or wireless communication bus (not shown), such that the main controller 80 may control the electrical power provided to each of the individual VTE fans.

Accordingly, it will be appreciated that in at least certain embodiments each VTE fan of the pluralities of VTE fans 46, 52, 54, 56 may be variable speed fans. Accordingly, by modifying an amount of electrical power provided to each VTE fan through a respective electric power controller 82, the aircraft 10 may modify a rotational speed of the respective VTE fan, and therefore an amount of vertical thrust provided by the respective VTE fan. In such a manner, the aircraft 10 may allow for more dynamic control during vertical takeoff and landing, or other vertical thrust operations.

It should be appreciated, however, that in other exemplary embodiments, the aircraft 10, or rather, the electric communication bus 38 may not include an electric power controller 82 for each of the individual VTE fans. Instead, for example, in other embodiments, the electric communication bus 38 may include a single electric power controller 82 for each of the individual pluralities of VTE fans 46, 52, 54, 56. In still other embodiments, however, any other suitable configuration may be provided.

Moreover, as briefly stated above, and as is shown in FIGS. 2 and 3, each of the wings 24, 26, 28, 30 are fixed wings including a variable control portion that is generally movable between a vertical thrust position (FIG. 2) and a forward thrust position (FIG. 3). More specifically, referring now also to FIGS. 4 and 5, providing a side, cross-sectional view of the aft starboard wing 24 and an interior VTE fan 50 of the first plurality of VTE fans 46, the aft starboard wing 24 (as well as the other wings 26, 28, 30, discussed in more detail below) generally includes a variable geometry portion 84. The variable geometry portion 84 is movable between a forward thrust position (FIG. 4), one or more transitional positions (not shown), and a vertical thrust position (FIG. 5), and further is generally formed of a surface portion of the respective wings 24, 26, 28, 30. As will be appreciated, however, a main body or frame portion of the wings 24, 26, 28, 30 remain stationary during this movement.

Figure 4:
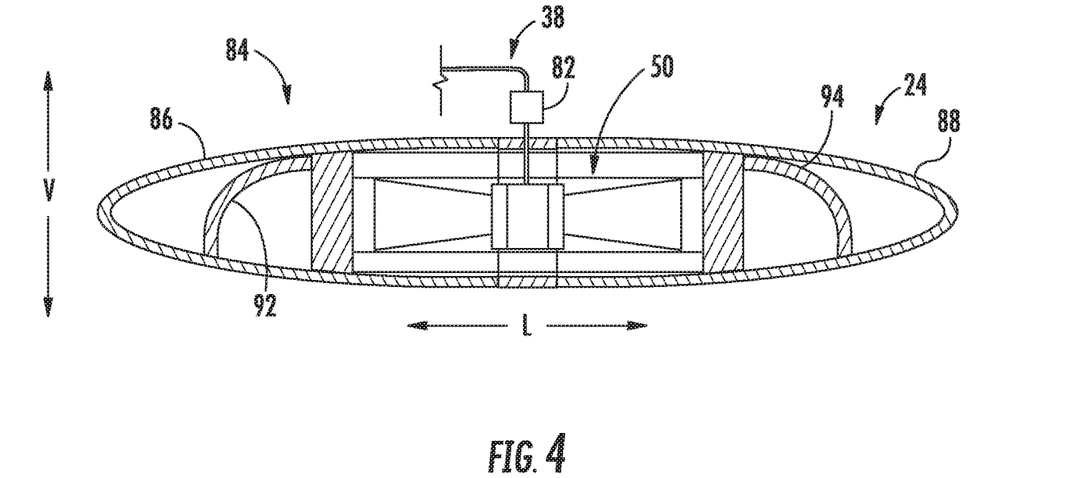
FIG. 4 is a side, schematic view of a wing in accordance with an exemplary embodiment of the present disclosure as may be incorporated into the exemplary aircraft of FIG. 1 in a forward flight position.
Figure 5:
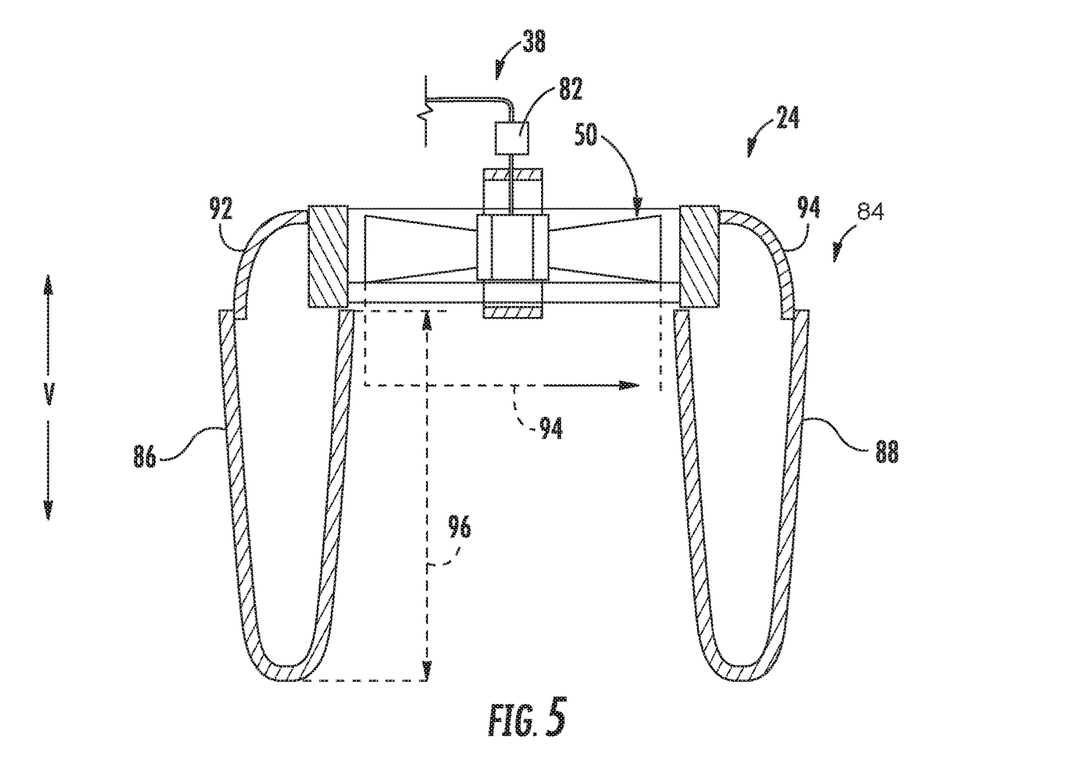
FIG. 5 is a side, schematic view of the exemplary wing of Fig. for in a vertical flight position.

When the variable geometry portion 84 is moved from the forward thrust position to the vertical thrust position, the first plurality of VTE fans 46 are exposed. By contrast, when the variable geometry portion 84 is moved from the vertical thrust position to the forward thrust position, the first plurality of VTE fans 46 are substantially completely covered. For the embodiment depicted, the variable geometry portion 84 forms a lift fan exhaust arrangement for the first plurality of VTE fans 46 when moved to the vertical thrust position. It will be appreciated, that as used herein, the term "exhaust arrangement" refers generally to any structure located downstream of the respective fan configured to channel at least a portion of an airflow from the respective fan to increase a power loading (i.e., a ratio of thrust produced to an amount of power received) of such fan. For example, the exhaust arrangement may be configured generally as a nozzle or diffuser for the respective fans.

More specifically, for the embodiment depicted, the aft starboard wing 24, or rather, the variable geometry portion 84 of the aft starboard wing 24, generally includes a forward section 86 and an aft section 88. Referring back briefly to FIGS. 2 and 3, it will be appreciated that for the embodiment shown, the forward section 86 and the aft section 88 of the variable geometry portion 84 each extend from the innermost VTE fan of the first plurality of VTE fans 46 to the outermost VTE fan 48 of the first plurality of VTE fans 46. In such a manner, when the variable geometry portion 84 is moved to the vertical thrust position, the exhaust arrangement formed by the variable geometry portion 84 also extends from the innermost VTE fan of the first plurality of VTE fans 46 to the outermost VTE fan 48 of the first plurality of VTE fans 46.

Referring particularly to FIG. 4, when the variable geometry portion 84 of the aft starboard wing 24 is in the forward thrust position, the forward section 86 and the aft section 88 together define at least in part an airfoil cross-sectional shape. Such may allow for relatively efficient forward flight for the aircraft 10. By contrast, however, as is depicted in FIG. 5, when the variable geometry portion 84 of the aft starboard wing 24 is moved to the vertical thrust position, the forward section 86 and the aft section 88 of the variable geometry portion 84 together form the exhaust arrangement. For example, in certain exemplary embodiments, the forward section 86 may be mounted on a forward track 90 within the aft starboard wing 24 such that when it is moved from the forward thrust position to the vertical thrust position it translates forward along the lateral direction and pivots downward along the vertical direction V to the position shown in FIG. 5. Similarly, the aft section 88 may be mounted on an aft track 92 within the aft starboard wing 24 such that when it is moved from the forward thrust position to the vertical thrust position it translates aft along the lateral direction and pivots downward along the vertical direction V to the position shown in FIG. 5.

It will be appreciated that each of the first plurality of VTE fans 46 define a fan diameter 94, and for the embodiment depicted (see FIG. 2), the fan diameter 94 of each of the plurality of VTE fans is substantially the same. Further, the exhaust arrangement formed by the variable geometry portion 84 of the aft starboard wing 24 defines a length 96 along the vertical direction V. For the embodiment depicted, the length 96 is equal to, or greater than the fan diameter 94 of each VTE fan of the first plurality of VTE fans 46. More specifically, for the embodiment depicted, the length 122 is at least about ten percent greater the fan diameter 120 of each VTE fan of the first plurality of VTE fans 46. For example, in at least certain embodiments, the length 122 may be at least about fifteen percent greater, such as at least about twenty-five percent greater, such as at least about fifty percent greater than the fan diameter 120 of each VTE fan of the first plurality of VTE fans 46, and may be less than or equal to ten times the fan diameter 120 of each VTE fan.

It will additionally be appreciated that each of the remaining wings 26, 28, 30 similarly include a variable geometry portion 84 movable between a forward thrust position and a vertical thrust position, wherein such variable geometry portion 84 forms an exhaust arrangement when in the vertical thrust position. It will be appreciated, however, that in other exemplary embodiments, the variable geometry portion 84 of each wings 24, 26, 28, 30 may have any other suitable configuration for forming an exhaust arrangement for each respective plurality of VTE fans 46, 52, 54, 56 integrated therein.

It will further be appreciated that inclusion of wings 24, 26, 28, 30 having a variable geometry portion 84 for forming an exhaust arrangement for each of the pluralities of VTE fans 46, 52, 54, 56 may allow for much higher efficiency VTE fans. In such a manner, each of the pluralities of VTE fans 46, 52, 54, 56 may be smaller than would otherwise be required to generate a necessary amount of vertical thrust for the aircraft 10 to perform vertical takeoffs, vertical landings, and general hover maneuvers.

Further, with the inclusion of the distributed VTE fans along the length of the respective wings 24, 26, 28, 30 in the manner described herein, combined with the increased efficiency allowed by the exhaust arrangements formed by the respective wings 24, 26, 28, 30, each of the wings 24, 26, 28, 30 may define an aspect ratio providing for relatively efficient forward flight. More specifically, for the embodiment depicted, the aft starboard wing 24 may define an aspect ratio between about A and about B. More specifically, for the embodiment depicted, the aft starboard wing 24 may define an aspect ratio between about 3:1 and about 5.5:1. More specifically, for the embodiment depicted, the aft starboard wing 24 may define an aspect ratio between about 4:1 and about 5:1. Further, the aft port wing 26 may define aspect ratio that is substantially equal to the aspect ratio of the aft starboard wing 24. Further, the forward starboard wing 28 and the forward port wing 30 may each define an aspect ratio between about 1.5:1 and about 5:1, such as between about 2:1 and about 3:1.

It will be appreciated, that as used herein, the term "aspect ratio," with reference to one or more of the wings 24, 26, 28, 30, generally refers to a ratio of the wing's span to its mean chord.

Inclusion of wings configured in such a manner may allow for an overall more efficient aircraft 10.

Moreover, as briefly noted above, the propulsion system 32 is configured as a hybrid electric propulsion system including the power source 36 (the power source 36 having the combustion engine 40 and the electric machine 42) and the forward thrust propulsor 34, with the forward thrust propulsor 34 selectively or permanently mechanically coupled to the combustion engine 40 of the power source 36. More specifically, referring now to FIG. 6, a schematic view is provided of the exemplary combustion engine 40 of the power source 36 of the propulsion system 32 described above with reference to FIGS. 1 through 3. For the embodiment depicted, the combustion engine 40 is a turboshaft engine. The turboshaft engine includes in serial flow order, a compressor section including a low pressure compressor 98 and a high pressure compressor 100, a combustion section 102, and a turbine section including a high pressure turbine 104 and a low pressure turbine 106. During operation, a flow of air is received within the compressor section and is progressively compressed as it flows therethrough, i.e., as it flows from the low pressure compressor 98 to the high pressure compressor 100. The compressed air is then provided to the combustion section 102 where it is mixed with fuel and burned to generate hot combustion gas. The aircraft 10 further includes a fuel tank 108 for providing the fuel to the combustion section 102 (see FIGS. 2 and 3).

Figure 6:
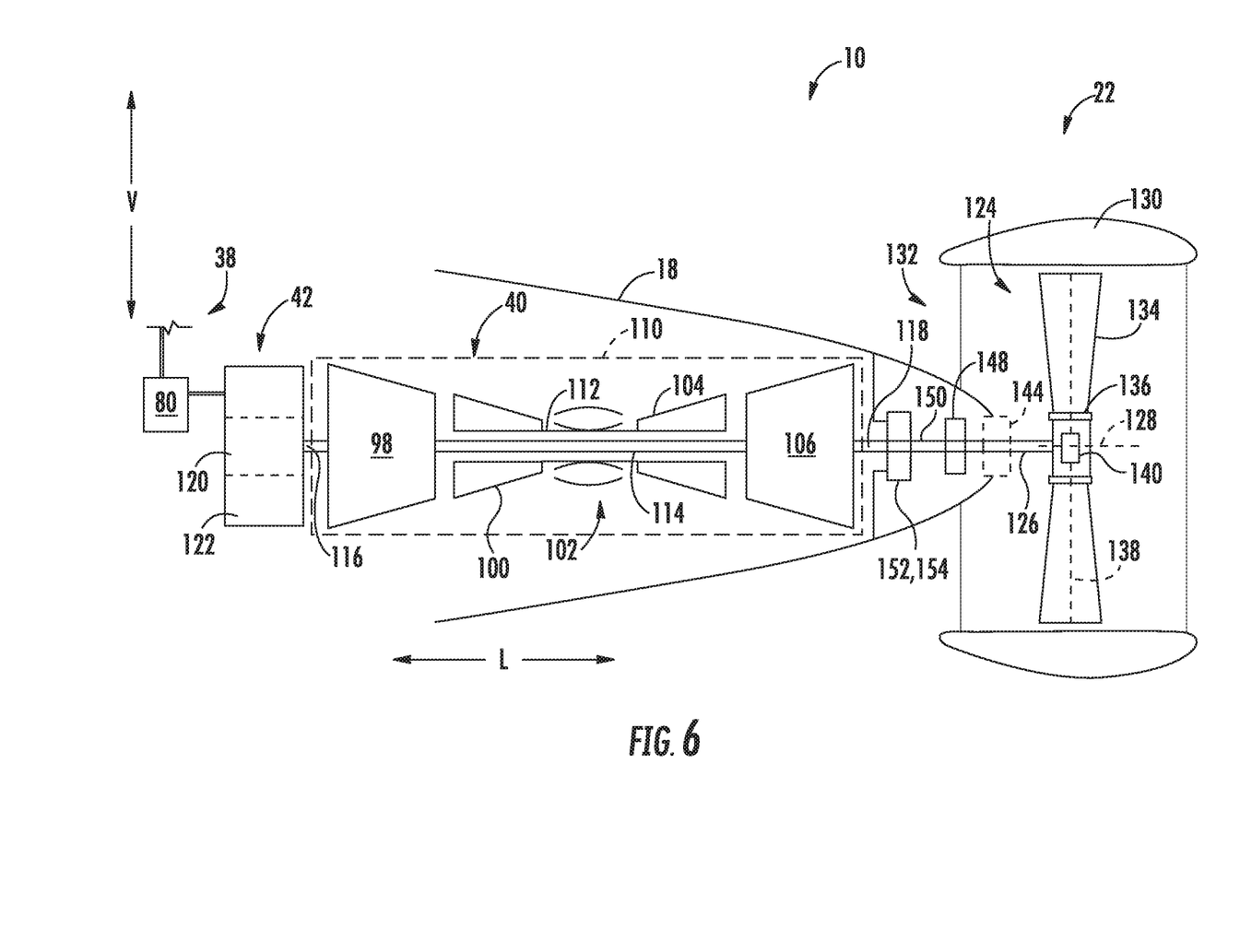
FIG. 6 is a schematic view of a power source of the exemplary aircraft of FIG. 1.

The hot combustion gas is expanded through the turbine section where rotational energy is extracted therefrom. Specifically, the hot combustion gas rotates the high pressure turbine 104 and the low pressure turbine 106 as the gas flows therethrough and is expanded. As is depicted in phantom, these components may be enclosed within a casing 110 within, e.g., the fuselage 18 of the aircraft 10. Although not depicted, the hot combustion gas may be exhausted, e.g., to atmosphere, from the low pressure turbine 106.

Also for the embodiment depicted, the high pressure turbine 104 is connected to the high pressure compressor 100 through a high pressure shaft or spool 112, such that a rotation of the high pressure turbine 104 additionally rotates the high pressure compressor 100. Similarly, the low pressure turbine 106 is connected to the low pressure compressor 98 through a low pressure shaft or spool 114, such that rotation of the low pressure turbine 106 additionally rotates the low pressure compressor 98.

It will be appreciated, however, that the exemplary turboshaft engine depicted in FIG. 6 is provided by way of example only. In other exemplary embodiments, the turboshaft engine may have any other suitable configuration. For example, in other embodiments, the turboshaft engine may include any other suitable number of compressors and/or any other suitable number of turbines. Further, in still other embodiments, the combustion engine may be any other suitable combustion engine, such as a rotary or internal combustion engine.

Referring still to FIG. 6, the low pressure shaft 114 additionally drives an output shaft. More specifically, for the embodiment of FIG. 6, the low pressure shaft 114 additionally drives a first output shaft, or a forward output shaft 116, of the turboshaft engine and further drives second output shaft, or an aft output shaft 118 of the turboshaft engine. The forward output shaft 116 extends to the electric machine 42. Accordingly, rotation of the turboshaft engine provides, at least during certain operations, rotational energy to the electric machine 42 via the forward output shaft 116. The electric machine 42, in turn, is configured to convert the rotational energy to generate electrical power. More specifically, it will be appreciated that at least certain embodiments of the electric machine 42, such as the embodiment shown, may generally include a rotor 120 and a stator 122. The rotational energy of the turboshaft engine is provided via the forward output shaft 116 and configured to rotate the rotor 120 of the electric machine 42 relative to the stator 122. Such relative movement may generate electrical power.

Inclusion of a turboshaft engine and electric machine 42 in accordance with such an exemplary embodiment may allow for the electric power source 36 to generate a relatively high amount of electric power and to provide such electric power to the plurality of VTE fans of the propulsion system 32.

As is briefly discussed above, the turboshaft engine further drives the forward thrust propulsor 34 of the hybrid electric propulsion system 32. For the embodiment depicted, the forward thrust propulsor 34 is comprises a fan 124 coupled to a fan shaft 126. The aft output shaft 118 of the turboshaft engine is selectively mechanically coupled to or permanently mechanically coupled to the fan shaft 126 to allow the turboshaft engine to drive the fan 124. More specifically, during operation, the aft output shaft 118 of the turboshaft engine may drive the fan shaft 126 to rotate the fan 124 about a fan axis 128. Notably, the forward thrust propulsor 34 further includes an outer nacelle 130 surrounding at least a portion of the fan 124. In such a manner, the forward thrust propulsor 34 may be referred to as a ducted fan.

It will be appreciated, that as used herein, the term "permanently mechanically coupled to," with reference to the fan shaft 126 and output shaft 118 refers to a coupling that does not allow for the output shaft 118 to be decoupled from, or otherwise freely rotatable relative to, the fan shaft 126 during operation, such as flight operations, of the aircraft 10.

It will further be appreciated that for the embodiment depicted, the forward thrust propulsor 34 is mounted to the fuselage 18 of the aircraft 10 at an aft end 22 of the aircraft 10. Although not depicted, the forward thrust propulsor 34 may include one or more struts, or other structural members, extending between the outer nacelle 130 and the fuselage 18 of the aircraft 10 to mount the forward thrust propulsor 34 to the fuselage 18 of the aircraft 10. Moreover, the forward thrust propulsor 34 is configured as a boundary layer ingestion fan defining an inlet 132 extending substantially 360 degrees around the fuselage 18. In such a manner, the forward thrust propulsor 34 may ingest a boundary layer airflow over the fuselage 18, and may re-energize such airflow to create a forward thrust for the aircraft 10.

Further, the fan 124 of the forward thrust propulsor 34 includes a plurality of fan blades 134 coupled to a disk 136, with the disk 136 coupled to the fan shaft 126. More specifically, for the embodiment depicted, each of the plurality of fan blades 134 are rotatably coupled to the disk 136 about a respective pitch axis 138. The forward thrust propulsor 34 further includes a pitch change mechanism 140 operable with each of the plurality of fan blades 134 to rotate each of the plurality of fan blades 134 about their respective pitch axes 138, e.g., in unison. Accordingly, for the embodiment depicted the forward thrust propulsor 34 is configured as a variable pitch fan.

Figure 7:
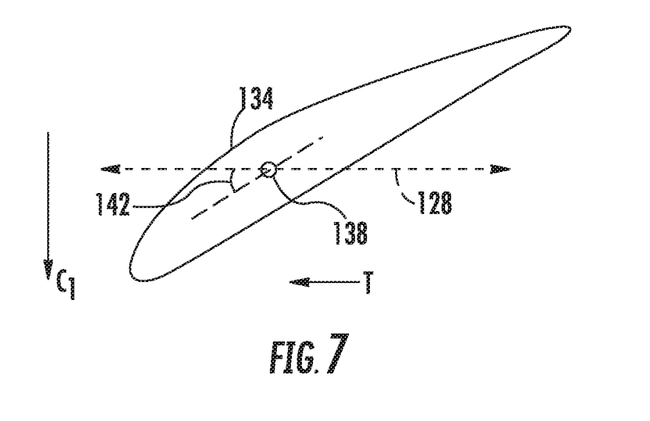
FIG. 7 is a schematic, axial view of a fan blade in accordance with an exemplary embodiment of the present disclosure in a first position.
Figure 8:
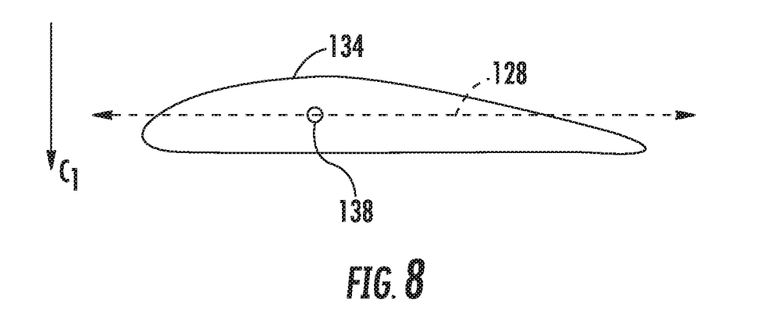
FIG. 8 is a schematic, axial view of the exemplary fan blade of FIG. 7 in a second position.
Figure 9:
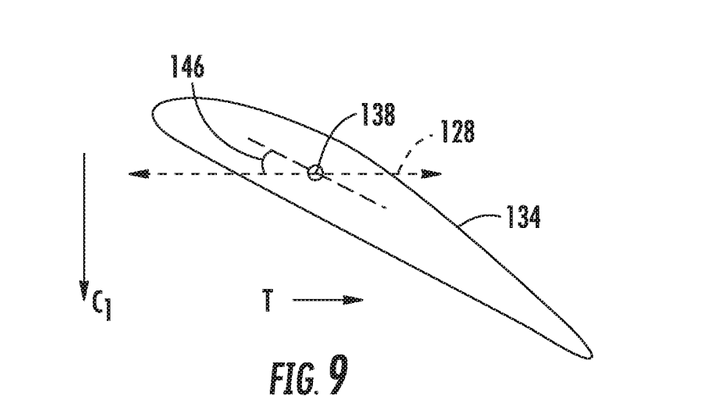
FIG. 9 is a schematic, axial view of the exemplary fan blade of FIG. 7 in a third position.

As will be appreciated, changing a pitch of the plurality of fan blades 134 may allow for a modification of an amount of thrust generated by the forward thrust propulsor 34 during operation without requiring a change in a rotational speed of the fan 124. For example, referring generally to FIGS. 7, 8, and 9, three views of a fan blade 134 of the plurality of fan blades 134 of the forward thrust propulsor 34 are provided, each along the pitch axis 138 of the fan blade 134. For the embodiment of FIG. 7, the fan is in a first position defining a first pitch angle 142 relative to the fan axis 128. The first pitch angle 142 may be a negative angle relative to the fan axis 128. When the plurality of fan blades 134 of the fan 124 are rotated in a first circumferential direction C1 (with the plurality of fan blades 134 of the fan 124 defining the first pitch angle 142), the fan 124 generates a forward thrust. By contrast, FIG. 8 depicts the fan 124 in a second position wherein the fan blades 134 define a second pitch angle (not labeled) relative to the fan axis 128. The second pitch angle 144 may be substantially equal to 0. When the plurality of fan blades 134 of the fan 124 are rotated in the first circumferential direction C1 (with the plurality of fan blades 134 defining the second pitch angle), the fan 124 generates substantially no thrust. Further, FIG. 9 depicts the fan 124 in a third position defining a third pitch angle 146 relative to the fan axis 128. The third pitch angle 146 may be a positive pitch angle relative to the fan axis 128. When the plurality of fan blades 134 of the fan 124 are rotated in the first circumferential direction C1 (with the plurality of fan blades 134 of the fan 124 defining the third pitch angle 146), the fan 124 generates a reverse thrust. In such a manner, it will be appreciated that for the embodiment depicted, the fan 124 defines a pitch range (i.e., a range of pitch angles) enabling the variable pitch fan 124 to generate a forward thrust, a reverse thrust, and substantially no thrust during operation. Accordingly, such may allow for greater control of the aircraft 10 in, e.g., a hover mode or other vertical flight mode.

Referring again to FIG. 6, it will be appreciated that the exemplary propulsion system 32 depicted further includes a coupling unit 148, with the turboshaft engine selectively mechanically coupled to the forward thrust propulsor 34 through the coupling unit 148. The coupling unit 148 may be at least one of a clutch or a torque converter. More specifically, for the embodiment depicted, the coupling unit 148 includes a clutch, and more specifically, includes a one-way clutch. For example, in certain embodiments, the one-way clutch may be a sprag clutch.

For example, in certain exemplary embodiments, as is depicted in phantom, the forward thrust propulsor 34 may further include a drive electric machine 144, or rather, a drive motor, coupled to the fan shaft 126. The drive electric machine 144 may be electrically coupled to the power source 36, such as to one or more of the electric machine 42 or electric energy storage unit 44, through the electric communication bus 38. The drive electric machine 144 may receive electrical power to drive the fan 124 of the forward thrust propulsor 34 during, e.g., emergency operations. Inclusion of a one-way clutch in the coupling unit 148, such as a sprag clutch, may allow for the drive electric machine 144 to rotate the fan 124 without having to correspondingly rotate the combustion engine 40 (i.e., turboshaft for the embodiment depicted).

It will be appreciated, however, that in other exemplary embodiments, the clutch may instead be a two-way clutch actuatable between an engaged position and a disengaged position. When in the engaged position, the fan shaft 126 may rotate with the aft output shaft 118 of the turboshaft engine (via an intermediate shaft 150). By contrast, when in the disengaged position, the aft output shaft 118 of the turboshaft engine may rotate independently of the fan shaft 126. For example, in certain embodiments, the aircraft 10 may move the clutch to the disengaged position during, e.g., vertical takeoff, vertical landing, or hover operations wherein forward thrust is not required from the forward thrust propulsor 34. However, when the aircraft 10 transitions to forward thrust operations, such as cruise operations, the clutch may be moved to the engaged position to allow the forward thrust propulsor 34 to generate forward thrust for the aircraft 10.

Further, still, for the embodiment depicted in FIG. 6, the aircraft 10 additionally includes a speed change mechanism 152, with turboshaft engine being mechanically coupled to the forward thrust propulsor 34 through the speed change mechanism 152. More specifically, for the embodiment of FIG. 6, the speed change mechanism 152 is configured as a gearbox. More specifically, still, for the embodiment of FIG. 6, the speed change mechanism 152 is configured as a planetary gear box 154.

Figure 10:
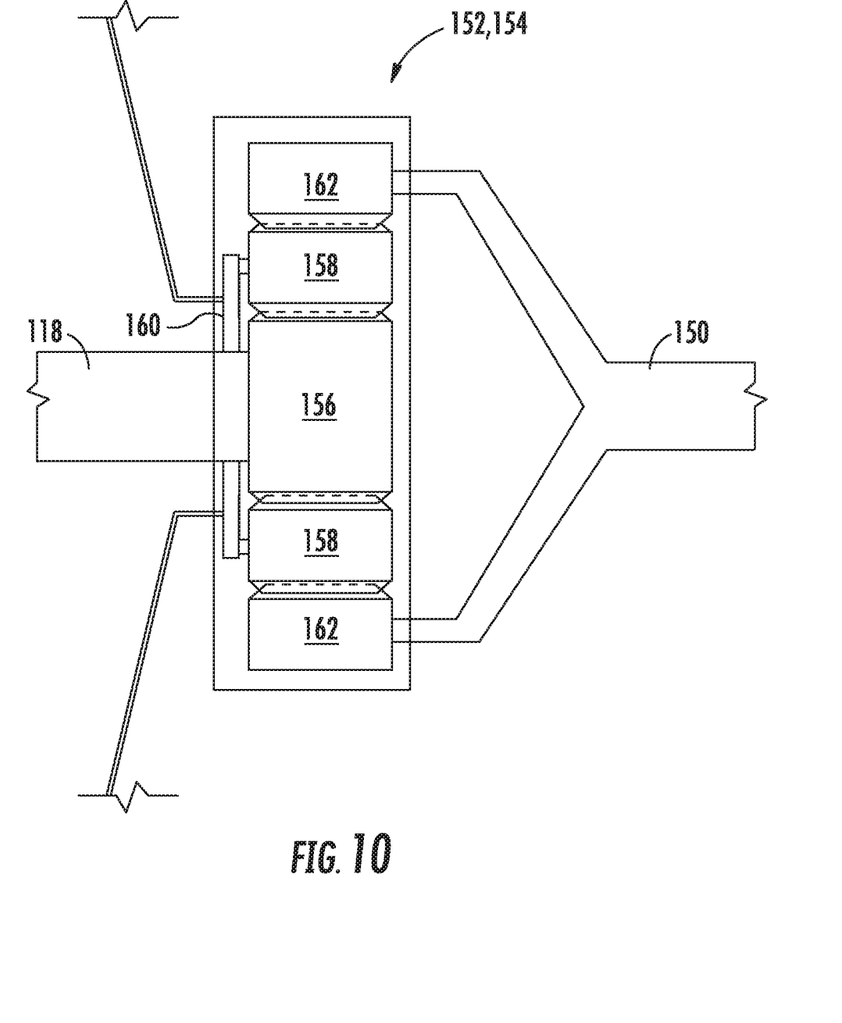
FIG. 10 is a close-up, schematic view of a gearbox in accordance with an exemplary embodiment of the present disclosure.

For example, referring now also to FIG. 10 a close-up, side, cross-sectional view is provided of the exemplary planetary gear box 154 of FIG. 6. As is depicted, the planetary gear box 154 generally includes a sun gear 156 coupled to the aft output shaft 118 of the turboshaft engine, a plurality of planet gears 158 coupled to a planet gear carrier 160, with the planet gear carrier 160 coupled to a structural component of the aircraft 10, and a ring gear 162 coupled to the fan shaft 126 the forward thrust propulsor 34. More specifically, the ring gear 162 is coupled to an intermediate shaft 150, which is in turn coupled to the fan shaft 126. In such a manner, a rotational speed of the fan 124 of the forward thrust propulsor 34 may be modified relative to a rotational speed of the aft output shaft 118 of the turboshaft engine. Accordingly, such may allow for the fan 124 of the forward thrust propulsor 34 to rotate at, e.g. a lower rotational speed relative to the aft output shaft 118, which may result in a more efficient forward thrust propulsor 34.

It will be appreciated, however, that in other exemplary embodiments, the planetary gear box 154 may have any other suitable configuration. For example, in other embodiments, the aft output shaft 118 may be coupled to the ring gear 162, or the planet gear carrier 160, and further, the fan shaft 126 may be coupled to the sun gear 156 or planet gear carrier 160 (via the intermediate shaft 150). Further, in still other embodiments, any other suitable gearbox may be utilized to change a relative speed between the fan shaft 126 and aft output shaft 118.

Further, in still other embodiments, any other suitable speed change mechanism 152 may be utilized. For example, in other exemplary embodiments, speed change mechanism 152 may be a transmission, such that the combustion engine 40 is mechanically coupled to the forward thrust propulsor 34 through the transmission. More specifically, in certain embodiments, the transmission may be one of a continuously variable transmission 164 or a hydraulic transmission.

Figure 11:
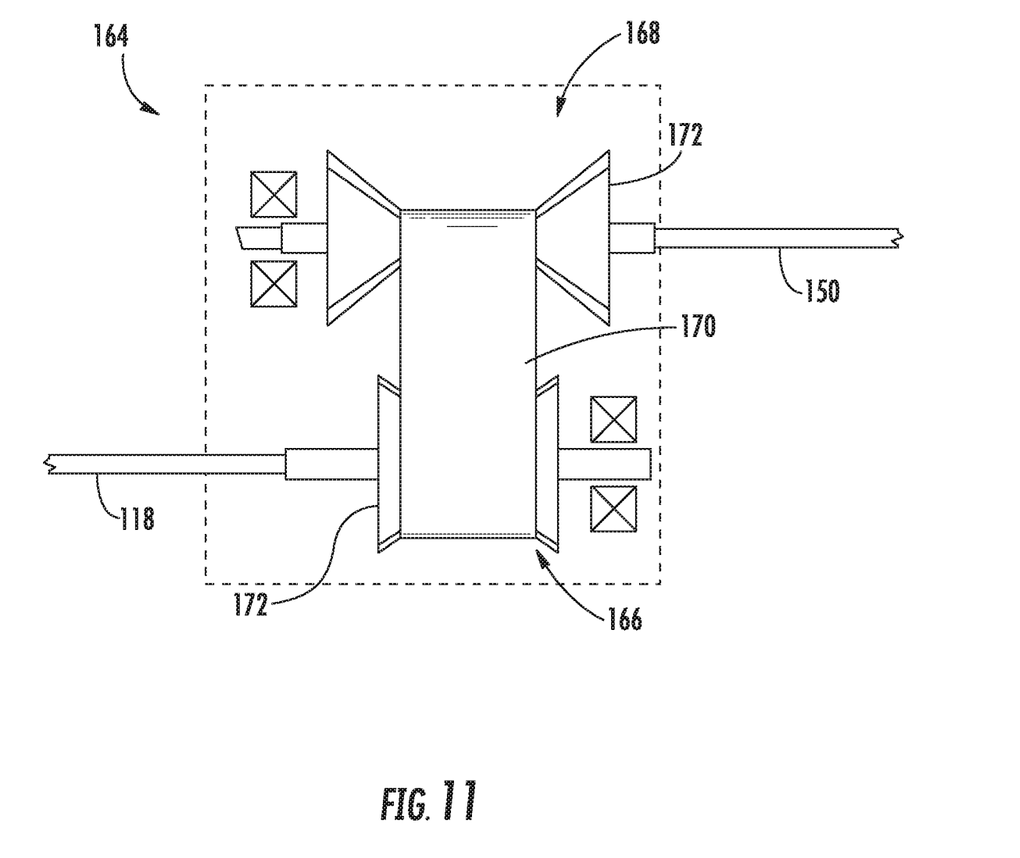
FIG. 11 is a close-up, schematic view of a transmission in accordance with an exemplary embodiment of the present disclosure.

For example, referring now to FIG. 11, a schematic view is provided of a continuously variable transmission 164 in accordance with an exemplary embodiment of the present disclosure. Accordingly, it will be appreciated that in one or more embodiments of the present disclosure, the speed change mechanism 152 may be configured in a similar manner as the exemplary continuously variable transmission 164 of FIG. 11. As is depicted, the exemplary continuously variable transmission 164 generally includes a driving gear 166 and a driven gear 168 coupled through a belt 170. The driving gear 166 is coupled to the aft output shaft 118 of the turboshaft engine and the driven gear 168 is coupled to the fan shaft 126 (via an intermediate shaft 150). Each of the driving gear 166 and driven gear 168 generally include opposing conical shaped members 172 movable closer to one another (see, e.g., the driving gear 166), and further movable away from another (see, e.g., the driven gear 168). By moving the opposing conical shaped members 172 of the driven gear 168 and driving gear 166 closer to one another or further away from another, the continuously variable transmission 164 may provide a large variety of gear ratios to rotatably connect the aft output shaft 118 of the turboshaft engine to the fan shaft 126.

It will be appreciated, however, that in other exemplary embodiments, any other suitable continuously variable transmission 164 may be provided. For example, in other embodiments, the continuously variable transmission 164 may be a variable diameter pulley type transmission, a roller based transmission, a magnetic transmission, an infinitely variable transmission, a cone transmission, etc.

Moreover, it will be appreciated that although for the embodiment depicted, the aircraft 10 includes the speed change mechanism 152 located forward of the coupling unit 148, in other embodiments, the relative location of these components may be reversed (which, e.g., may reduce a wear on the speed change mechanism 152 when, e.g., the coupling unit 148 decouples the two shafts 118, 126). Further, although the exemplary aircraft 10 depicted includes a speed change mechanism 152, a coupling unit 148, and a forward thrust propulsor 34 having a variable pitch fan, in other exemplary embodiments, the aircraft 10 may not include each of these components/features. For example, in other embodiments, the aircraft 10 may rely on a variable pitch fan of the forward thrust propulsor 34 for neutralizing any forward thrust from the forward thrust propulsor 34 during, e.g., vertical takeoff and vertical landing operations. Additionally, or alternatively, in other embodiments, the aircraft 10 may rely on the coupling unit 148 to neutralize a forward thrust from the forward thrust propulsor 34 during vertical takeoff and vertical landing operations (e.g., by including an actuatable clutch/two-way clutch). With such an embodiment, the aircraft 10 may therefore include a fixed pitch fan with the forward thrust propulsor 34. Additionally, or alternatively, still, in other embodiments, the aircraft 10 may rely on the speed change mechanism 152, such as a continuously variable transmission 164 (such as an infinitely variable transmission), to substantially neutralize a forward thrust from the forward thrust propulsor 34 during vertical takeoff and landing operations. With such an embodiment, the aircraft 10 therefore omit the coupling unit 148 and further may include a fixed pitch fan with the forward thrust propulsor 34. Further, in still other embodiments, any other suitable combination of these three components/features may be utilized. Still other embodiments and combinations are contemplated as well.

A vertical takeoff and landing aircraft having a forward thrust propulsor mechanically coupled to a combustion engine in accordance with one or more embodiments of the present disclosure may allow for a more robust and efficient coupling of the forward thrust propulsor to the combustion engine, while still allowing for desired amount of control of the amount of forward thrust generated by the forward thrust propulsor. Such may be achievable despite any necessary, relatively high rotational speed of the combustion engine during these vertical takeoff and landing operations (e.g., to generate the electrical power needed to run the plurality of vertical thrust electric fans).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An aircraft defining a vertical direction and a transverse direction, the aircraft comprising:
   a fuselage;
   a wing coupled to, and extending from, the fuselage; and
   a hybrid-electric propulsion system, the hybrid-electric propulsion system comprising:
      a power source comprising a combustion engine and an electric generator;
      a plurality of vertical thrust electric fans integrated into the wing and oriented to generate thrust along the vertical direction, the plurality of vertical thrust electric fans arranged along a length of the wing and driven by the power source;
      a forward thrust propulsor coupled to the combustion engine; and
      a drive motor coupled with the forward thrust propulsor, the drive motor positioned rearwardly of an aft end of the combustion engine and configured to selectively rotate the forward thrust propulsor, wherein an aft output shaft of the combustion engine is generally axially aligned with a fan axis of the forward thrust propulsor.

2. The aircraft of claim 1, wherein the combustion engine is a turboshaft engine comprising an output shaft, wherein the forward thrust propulsor comprises a fan shaft, and wherein the output shaft is selectively or permanently mechanically coupled to the fan shaft.

3. The aircraft of claim 1, wherein the forward thrust propulsor is configured as a variable pitch propulsor.

4. The aircraft of claim 3, wherein the variable pitch propulsor defines a pitch range enabling the variable pitch fan to generate forward thrust, reverse thrust, and substantially no thrust during operation.

5. The aircraft of claim 1, wherein the propulsion system further comprises a coupling unit, and wherein the combustion engine is selectively mechanically coupled to the forward thrust propulsor through the coupling unit.

6. The aircraft of claim 5, wherein the coupling unit comprises at least one of a clutch or a torque converter.

7. The aircraft of claim 5, wherein the coupling unit comprises a clutch.

8. The aircraft of claim 7, wherein the clutch is a one-way clutch.

9. The propulsion system of claim 5, wherein the drive motor is positioned downstream of the coupling unit and upstream of the forward thrust propulsor.

10. The aircraft of claim 1, wherein the forward thrust propulsor includes one or more fan blades and is mounted to the fuselage of the aircraft downstream of the combustion engine.

11. The aircraft of claim 10, wherein the forward thrust propulsor is a ducted fan.

12. The aircraft of claim 10, wherein the forward thrust propulsor is configured as a boundary layer ingestion fan defining an inlet extending substantially 360° around the fuselage.

13. The aircraft of claim 1, wherein the propulsion system further comprises a speed change mechanism, and wherein the combustion engine is mechanically coupled to the forward thrust propulsor through the speed change mechanism.

14. The aircraft of claim 13, wherein the speed change mechanism is a gearbox.

15. The aircraft of claim 13, wherein the speed change mechanism is a transmission.

16. The aircraft of claim 1, wherein the wing is a first wing, wherein the plurality of vertical thrust electric fans is a first plurality of vertical thrust electric fans, and wherein the aircraft further comprises:
a second wing coupled to and extending from the fuselage, wherein the propulsion system further comprises a second plurality of vertical thrust electric fans integrated into the second wing and oriented to generate thrust along the vertical direction, the second plurality of vertical thrust electric fans arranged along a length of the second wing.

17. A hybrid-electric propulsion system for an aircraft comprising:
a power source comprising a combustion engine and an electric generator;
a plurality of vertical thrust electric fans configured to be integrated into a wing of the aircraft in an orientation to generate thrust along a vertical direction of the aircraft, the plurality of vertical thrust electric fans driven by the power source;
a forward thrust propulsor selectively coupled to the combustion engine through a coupling unit, wherein the coupling unit is configured to disengage the forward thrust propulsor from the combustion engine when a variable geometry portion of the wing is moved from a position in which one or more of the plurality of vertical thrust electric fans are covered to a position in which one or more of the plurality of vertical thrust electric fans are exposed; and
a speed change mechanism positioned rearwardly of an aft end of the combustion engine and between the combustion engine and the coupling unit.

18. The propulsion system of claim 17, wherein the combustion engine is a turboshaft engine comprising an output shaft, wherein the forward thrust propulsor comprises a fan shaft, and wherein the output shaft is coupled to the fan shaft through the coupling unit.

19. The propulsion system of claim 17, wherein the forward thrust propulsor is configured as a variable pitch propulsor, and wherein the variable pitch propulsor defines a pitch range enabling the variable pitch propulsor to generate forward thrust, reverse thrust, and substantially no thrust during operation.

20. An aircraft defining a vertical direction and a transverse direction, the aircraft comprising:
a fuselage;
a wing coupled to, and extending from, the fuselage; and
a hybrid-electric propulsion system, the hybrid-electric propulsion system comprising:
a power source comprising a combustion engine and an electric generator;
a plurality of vertical thrust electric fans integrated into the wing and oriented to generate thrust along the vertical direction, the plurality of vertical thrust electric fans arranged along a length of the wing and driven by the power source;
a forward thrust propulsor coupled to the combustion engine, wherein the forward thrust propulsor is configured as a variable pitch propulsor; and
a drive motor coupled with the forward thrust propulsor, the drive motor positioned rearwardly of an aft end of the combustion engine and configured to selectively rotate the forward thrust propulsor, wherein an aft output shaft of the combustion engine is generally axially aligned with a fan axis of the forward thrust propulsor.

\* \* \* \* \*